United States Patent
Yoshikawa et al.

(10) Patent No.: US 7,503,633 B2
(45) Date of Patent: Mar. 17, 2009

(54) IMAGE FORMING APPARATUS, PRINTOUT CONTROL SERVER, AND COMPUTER READABLE RECORDING MEDIUM ON WHICH A PRINTOUT MANAGING PROGRAM IS RECORDED

(75) Inventors: Takashi Yoshikawa, Kanagawa (JP); Toru Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 344 days.

(21) Appl. No.: 11/483,585

(22) Filed: Jul. 11, 2006

(65) Prior Publication Data
US 2007/0019019 A1    Jan. 25, 2007

(30) Foreign Application Priority Data
Jul. 22, 2005    (JP)    ............................. 2005-212485

(51) Int. Cl.
*B41J 29/38* (2006.01)
(52) U.S. Cl. ............................................ 347/14; 347/5
(58) Field of Classification Search ..................... 347/5, 347/14
See application file for complete search history.

(56) References Cited

U.S. PATENT DOCUMENTS

2004/0233472 A1*  11/2004  Gassho et al. .............. 358/1.15
2006/0195596 A1*   8/2006  Kawai ........................ 709/229

FOREIGN PATENT DOCUMENTS

| EP | 1 100 003 A2 | 5/2001 |
| EP | 1 241 562 A1 | 9/2002 |
| JP | 11-177743    | 7/1999 |
| JP | 2006-251904  | 9/2006 |

OTHER PUBLICATIONS

Extended European Search Report dated Nov. 7, 2006, for European Application No. 06014345.0-2304.

* cited by examiner

*Primary Examiner*—Thinh H Nguyen
(74) *Attorney, Agent, or Firm*—Harness, Dickey & Pierce

(57) ABSTRACT

An image forming apparatus connected to a printout control server is disclosed that manages the number of pages printed by the image forming apparatus. The image forming apparatus includes a page borrowing part for requesting the printout control server to lend X number of pages, a printing part for printing P number of pages after the page borrowing part borrows X number of pages from the printout control server, and a page returning part for returning X-P number of pages to the printout control server.

17 Claims, 19 Drawing Sheets

IMAGE FORMING APPARATUS, PRINTOUT CONTROL SERVER, AND COMPUTER READABLE RECORDING MEDIUM ON WHICH A PRINTOUT MANAGING PROGRAM IS RECORDED

BACKGROUND OF THE INVENTION

1. Field of the Invention

The present invention relates to an image forming apparatus, a printout control server, and a computer readable recording medium on which a printout managing program is recorded.

2. Description of the Related Art

An MFP (Multi Function Printer) installed in a convenience store is one example of a conventional MFP whose number of printable copies (pages) is subjected to management (control). In this case, the number of printable copies is controlled within the limits of the amount of money deposited into the MFP or the amount of money recorded in a prepaid card.

In an MFP installed in a company office, data regarding the number of printable copies for each employee may be stored in the MFP, so that the MFP can control the number of printable copies based on the data.

Currently, many companies have plural MFPs installed in the office and provide an environment where a single employee can use multiple MFPs. However, in such an environment, there may occur a problem where an employee can access an MFP-A but cannot access another nearby MFP-B. Furthermore, it is a burden to load the data of the printable copies into every MFP installed in the office.

SUMMARY OF THE INVENTION

The present invention may provide an image forming apparatus, a printout control server, and a computer readable recording medium on which a printout managing program is recorded that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming apparatus, a printout control server, and a computer readable recording medium on which a printout managing program is recorded particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image forming apparatus connected to a printout control server that manages the number of pages printed by the image forming apparatus, the image forming apparatus including: a page borrowing part for requesting the printout control server to lend X number of pages; a printing part for printing P pages after the page borrowing part borrows X number of pages from the printout control server; and a page returning part for returning X-P number of pages to the printout control server.

In the image forming apparatus according to an embodiment of the present invention, the image forming apparatus may further include: a printable page determining part for determining whether X number of pages is enough for printing P number of pages during the printing operation; a supplementary page borrowing part for requesting the printout control server to lend S number of pages when the printable page determining part determines that X number of pages is not enough for printing P number of pages.

In the image forming apparatus according to an embodiment of the present invention, the printing part may stop printing after printing X number of pages.

In the image forming apparatus according to an embodiment of the present invention, the printing part may continue printing even when S number of pages cannot be borrowed from the printout control server.

In the image forming apparatus according to an embodiment of the present invention, the image forming apparatus may further include: a verifying part for verifying the user operating the image forming apparatus.

In the image forming apparatus according to an embodiment of the present invention, the page borrowing part may determine that the X number of pages is borrowed after receiving a borrowing completion notice from the printout control server.

In the image forming apparatus according to an embodiment of the present invention, when a power outage occurs in the image forming apparatus during the printing operation, the page borrowing part may return X number of pages to the printout control server when the image forming apparatus is restarted.

In the image forming apparatus according to an embodiment of the present invention, when a power outage occurs in the image forming apparatus during the printing operation, the printing part may resume printing when the image forming apparatus is restarted in a case where the printing of P number of pages is not completed.

In the image forming apparatus according to an embodiment of the present invention, the page returning part may send a return completion notice when receiving a notice from the printout control server indicating the receipt of X-P number of pages.

Furthermore, another embodiment of the present invention provides a printout control server that manages the number of pages that are printed by an image forming apparatus, the printout control server including: a page assigning part for assigning X number of pages to the image forming apparatus.

In the printout control server according to an embodiment of the present invention, the printout control server may further include: a remaining page receiving part for receiving X-P number of pages from the image forming apparatus after the image forming apparatus prints P number of pages.

In the printout control server according to an embodiment of the present invention, the image forming apparatus may include the image forming apparatus claimed in claim 1.

Furthermore, another embodiment of the present invention provides a printout managing method for managing the number of pages that are printed by an image forming apparatus connected to a printout control server, the method including the steps of: a) requesting the printout control server to lend X number of pages; b) printing P number of pages after borrowing X number of pages from the printout control server; and c) returning X-P number of pages to the printout control server.

In the printout managing method according to an embodiment of the present invention, the printout managing method may further include the steps of: determining whether X number of pages are enough for printing P number of pages during the printing step; requesting the printout control server to lend S number of pages upon determining that X number of pages is not enough for printing P number of pages.

In the printout managing method according to an embodiment of the present invention, the printing step may stop printing when after printing X number of pages.

In the printout managing method according to an embodiment of the present invention, the printing step may be continued even when S number of pages cannot be borrowed from the printout control server.

In the printout managing method according to an embodiment of the present invention, the printout managing method may further include a step of: verifying the user operating the image forming apparatus.

In the printout managing method according to an embodiment of the present invention, the printout managing method may further include a step of: determining that X number of pages is borrowed after receiving a borrowing completion notice from the printout control server.

In the printout managing method according to an embodiment of the present invention, when a power outage occurs in the image forming apparatus during the printing step, the image forming apparatus may return X number of pages to the printout control server when the image forming apparatus is restarted.

In the printout managing method according to an embodiment of the present invention, when a power outage occurs in the image forming apparatus during the printing step, the printing step may be resumed when the image forming apparatus is restarted in a case where the printing of P number of pages is not completed.

In the printout managing method according to an embodiment of the present invention, a return completion notice may be sent from the image forming apparatus when the image forming apparatus receives a notice from the printout control server indicating the receipt of the X-P number of pages.

Furthermore, another embodiment of the present invention provides a computer readable recording medium on which a program is recorded for causing a computer to execute a printout control method for managing the number of pages printed by an image forming apparatus connected to a printout control server, the printout control method including the steps of: a) requesting the printout control server to lend X number of pages; b) printing P number of pages after borrowing X number of pages from the printout control server; and c) returning X-P number of pages to the printout control server.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings. For the sake of convenience, although the below-description uses the term "number of pages (number of printout copies)" for indicating the "number of times" (of executing a printing operation), it also corresponds to the number of printout sides or the number of tolls (charge) for executing a printing operation.

Figure 1:
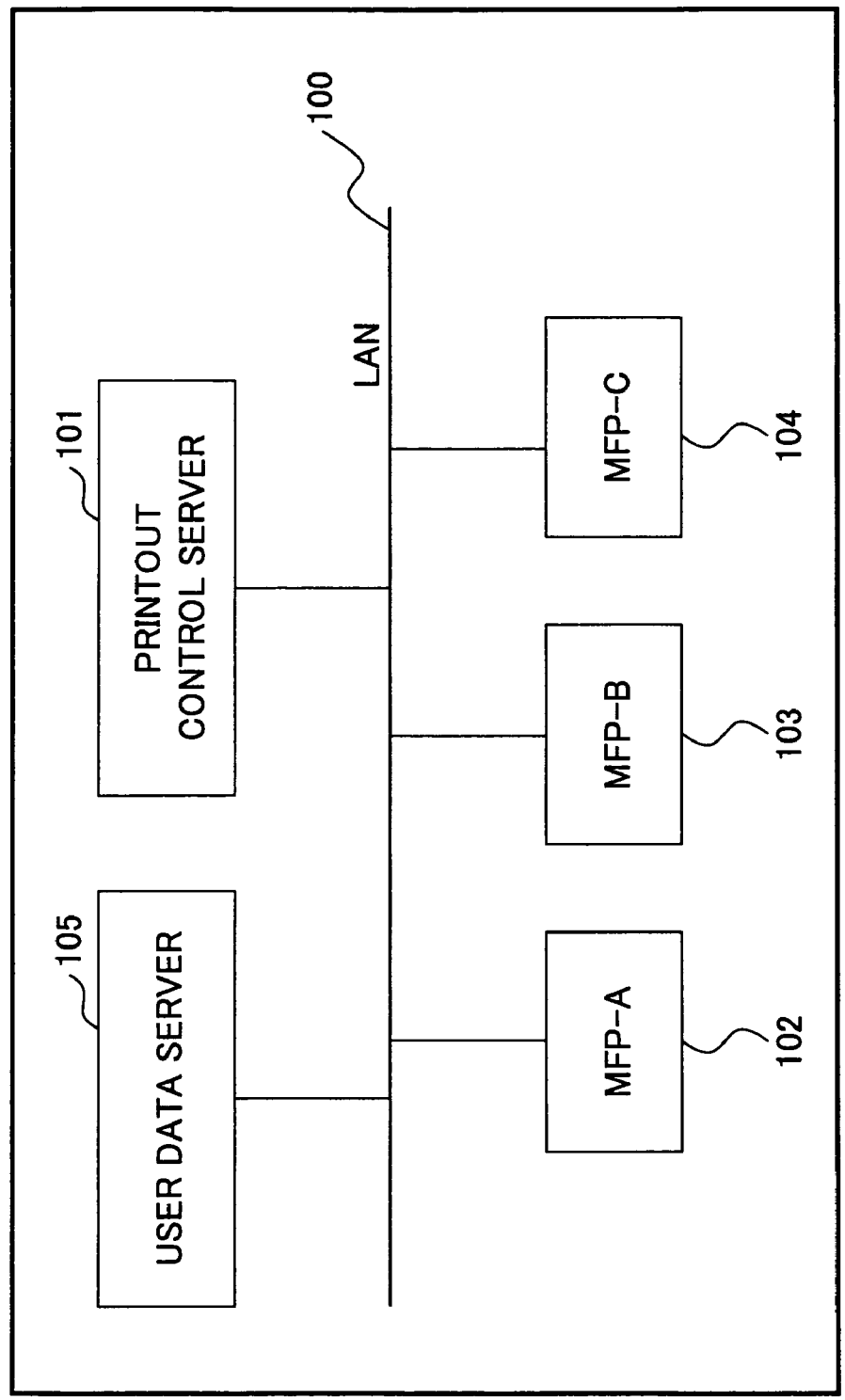
FIG. 1 is a block diagram showing an overall configuration of a system including an image forming apparatus and a printout control server according to an embodiment of the present invention.

FIG. 1 is a block diagram showing an overall configuration of a system according to an embodiment of the present invention. The system shown in FIG. 1 includes a printout control server 101, a user data server 105, an MFP-A 102, an MFP-B 103, and an MFP-C 104 that are connected via a LAN 100.

The printout control server 101 controls (manages) the number of copies printed by plural MFPs. In this example, the printout control server 101 controls the number of copies printed by the MFP-A 102, the MFP-B 103, and the MFP-C 104. The user data server 105 stores user data such as the user's ID and password. The user data server 105 refers to the stored data for authenticating the user using each of the MFPs.

The MFP-A 102, the MFP-B 103, and the MFP-C 104 are image forming apparatuses. The printout control server 101 assigns the MFP-A 102, the MFP-B 103, and the MFP-C 104 with data containing the number of copies that can be printed out (number of printout of copies). It is, however, to be noted that the MFP-A 102, the MFP-B 103, and the MFP-C 104 are not to be limited to multi-function printers. They may also be ordinary printers without multiple functions (e.g. scanning function, facsimile function, etc.).

Figure 2:
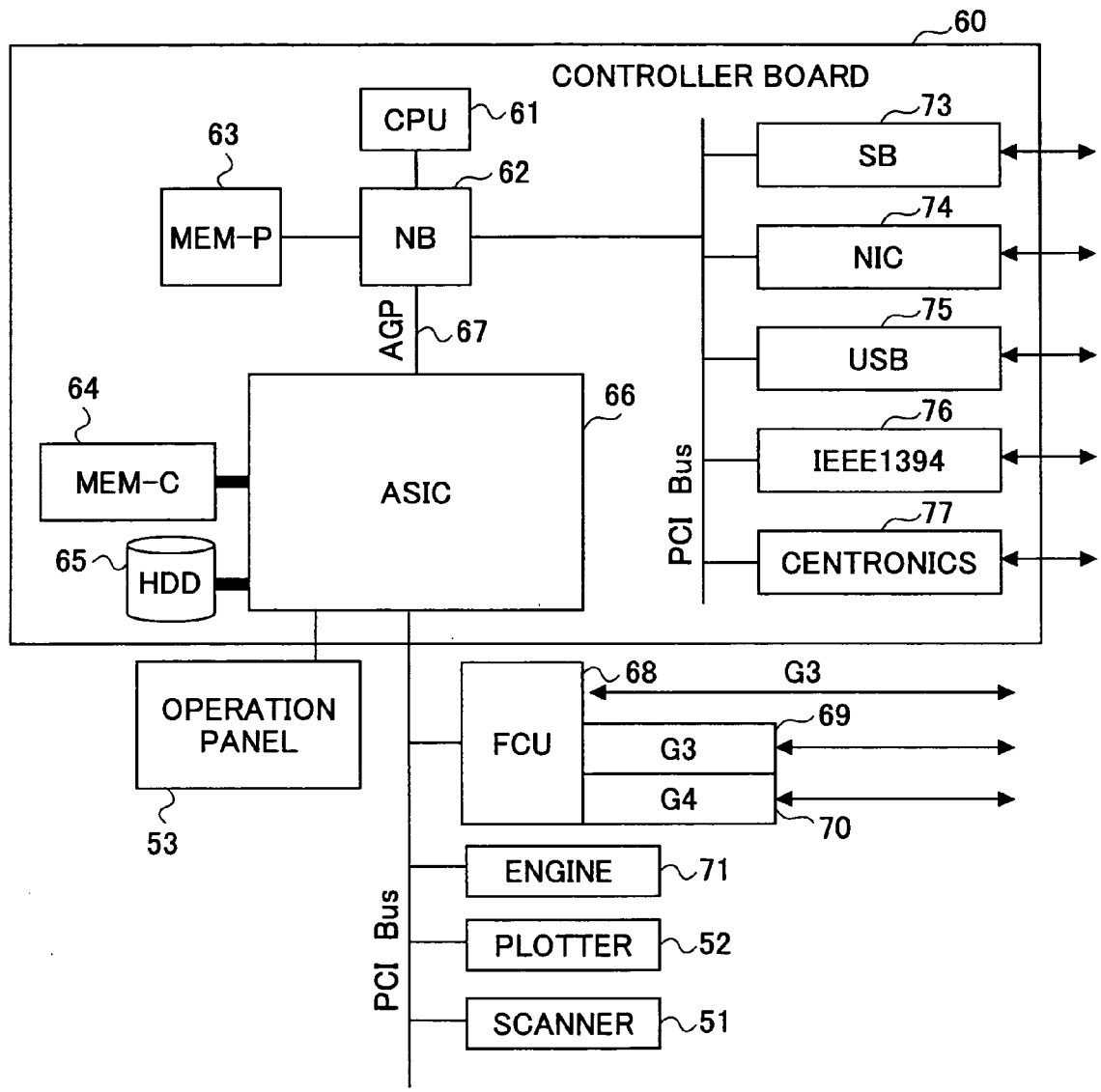
FIG. 2 is a schematic diagram showing an exemplary hardware configuration of an MFP according to an embodiment of the present invention.

Next, an exemplary hardware configuration of an MFP according to an embodiment of the present invention is described with reference to FIG. 2. The MFP according to an embodiment of the present invention includes a controller board 60, an operations panel 53, a FCU 68, an engine 71, a scanner 51, and a plotter 52. Furthermore, the FCU 68 includes a G3 standard compatible unit 69 and a G4 standard compatible unit 70.

The controller board 60 includes a CPU 61, an ASIC 66, a HDD 65, a local memory (MEM-C) 64, a system memory (MEM-P) 63, a north bridge (hereinafter indicated as "NB") 62, a south bridge (hereinafter indicated as "SB") 73, a NIC (Network Interface Card) 74, a USB (Universal Serial Bus) device 75, an IEEE1394 device 76, and a centronics device 77.

The operations panel 53 is connected to the ASIC 66 of the controller board 60. The SB 73, the NIC 74, the USB device 75, the IEEE 1394 device 76, the Centronics device 77, and the NB 62 are connected via a PCI bus.

The FCU 68, the engine 71, the scanner 51, and the plotter 52 are connected to the ASIC 66 of the controller board 60.

In the controller board 60, the ASIC 66 is connected to, for example, the local memory 64 and the HDD 65. The CPU 61 is connected to the ASIC 66 via the NB 62 (CPU chip set). Accordingly, even in a case where the interface of the CPU 61 is not disclosed, access can be made to the CPU 61 by connecting the CPU 61 and the ASIC 66 through the NB 62.

It is to be noted that the ASIC 66 and the NB 62 are not connected via a PCI bus but an AGP (Accelerated Graphics Port) 67. Since the ASIC 66 and the NB 62 are connected with the AGP 67 rather than a low speed PCI bus, control performance can be prevented from slowing down in a case of controlling the execution of multiple processes.

The CPU 61 performs the overall control of the MFP. The CPU 61 activates the programs on the OS and executes the multiple processes.

The NB 62 is for connecting the CPU 61, the system memory 63, the SB 73, and the ASIC 66. The system memory 63 is a memory used for plotting of the MFP. The SB 73 is for connecting the NB 62 to the PCI bus and other peripheral devices. The local memory 64 is used as a copy image buffer and/or a code buffer.

The ASIC 66 is an IC having hardware elements used for image processing purposes. The HDD 65 is a storage for storing, for example, image data, document data, programs, font data, and form data. The operations panel 53 is a control panel for receiving input from the user and displaying various controls to the user.

Next, an exemplary hardware configuration of the printout control server 101 and the user data server 105 according to an embodiment of the present invention is described with reference to FIG. 3.

Figure 3:
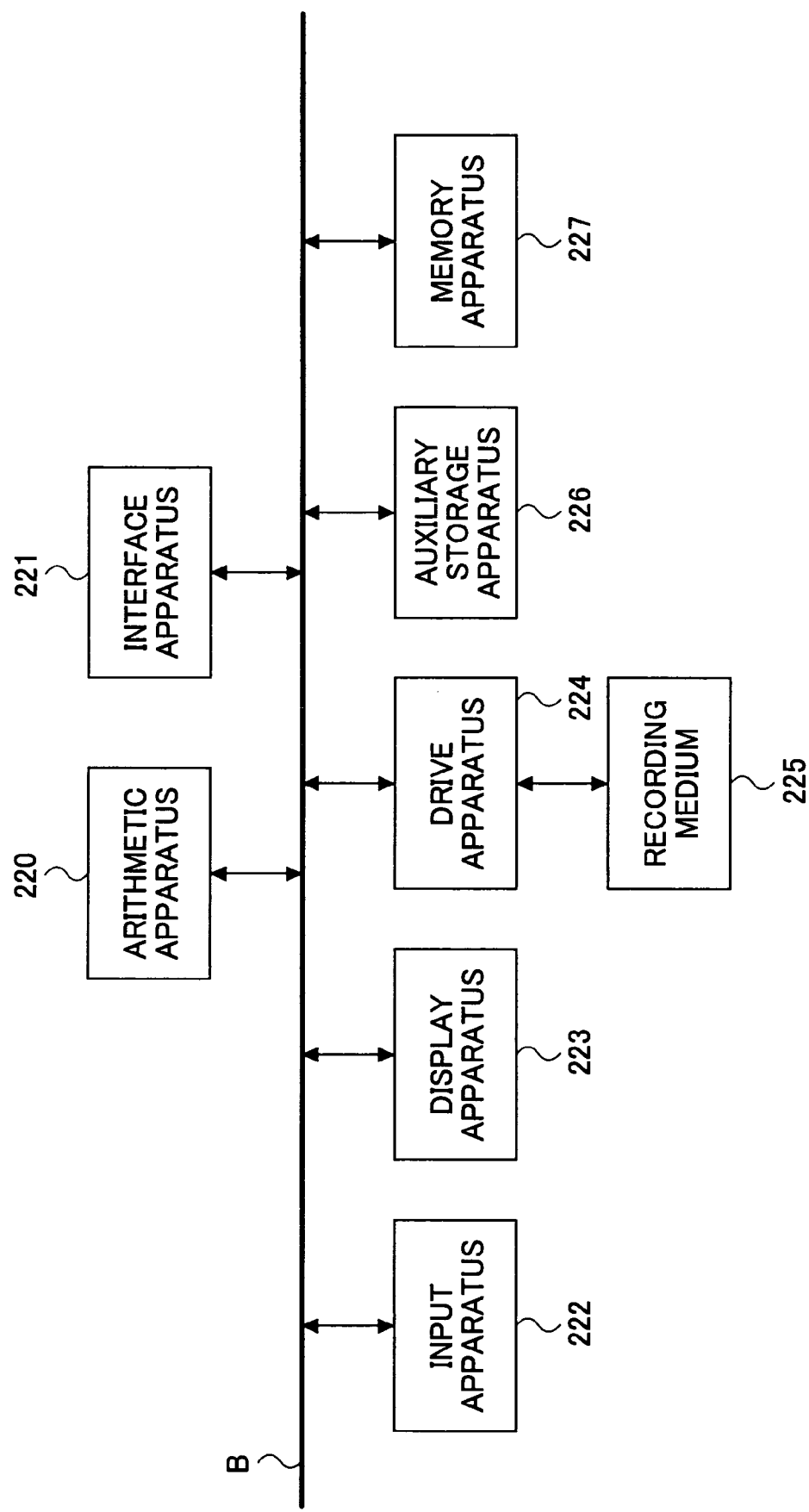
FIG. 3 is a block diagram showing an exemplary hardware configuration of a printout control server and a user data server according to an embodiment of the present invention.

The hardware configuration shown in FIG. 3 includes an input apparatus 222, a display apparatus 223, a drive apparatus 224, a computer readable recording medium 225, an auxiliary storage apparatus 226, a memory apparatus 227, an arithmetic apparatus, and an interface apparatus 221.

The input apparatus 222 includes, for example, a keyboard and a mouse for inputting various control (operation) signals. The display apparatus 223 displays various windows and data used for controlling the operations of the printout control server 101 and the user data server 105. The interface apparatus 221 includes an interface for connecting the printout control server 101 to a network (e.g. NIC (Network Interface Card) or to a peripheral device (e.g. USB).

The program for operating the printout control server 101 may be read out from the recording medium 225 (e.g. CD-ROM) or downloaded from the network. The recording medium 225 is placed in the drive apparatus 224 so that the data and programs recorded in the recording medium 225 are installed in the auxiliary storage apparatus 226 via the drive apparatus 224.

In addition to storing the data and programs, the auxiliary storage apparatus 226 also stores various files. Upon activation of the printout control server 101, the memory apparatus 227 reads out the program stored in the auxiliary storage apparatus 226 and loads the read out program. The arithmetic apparatus 220 executes a process(es) in accordance with the read out program loaded in the memory apparatus 227.

Figure 4:
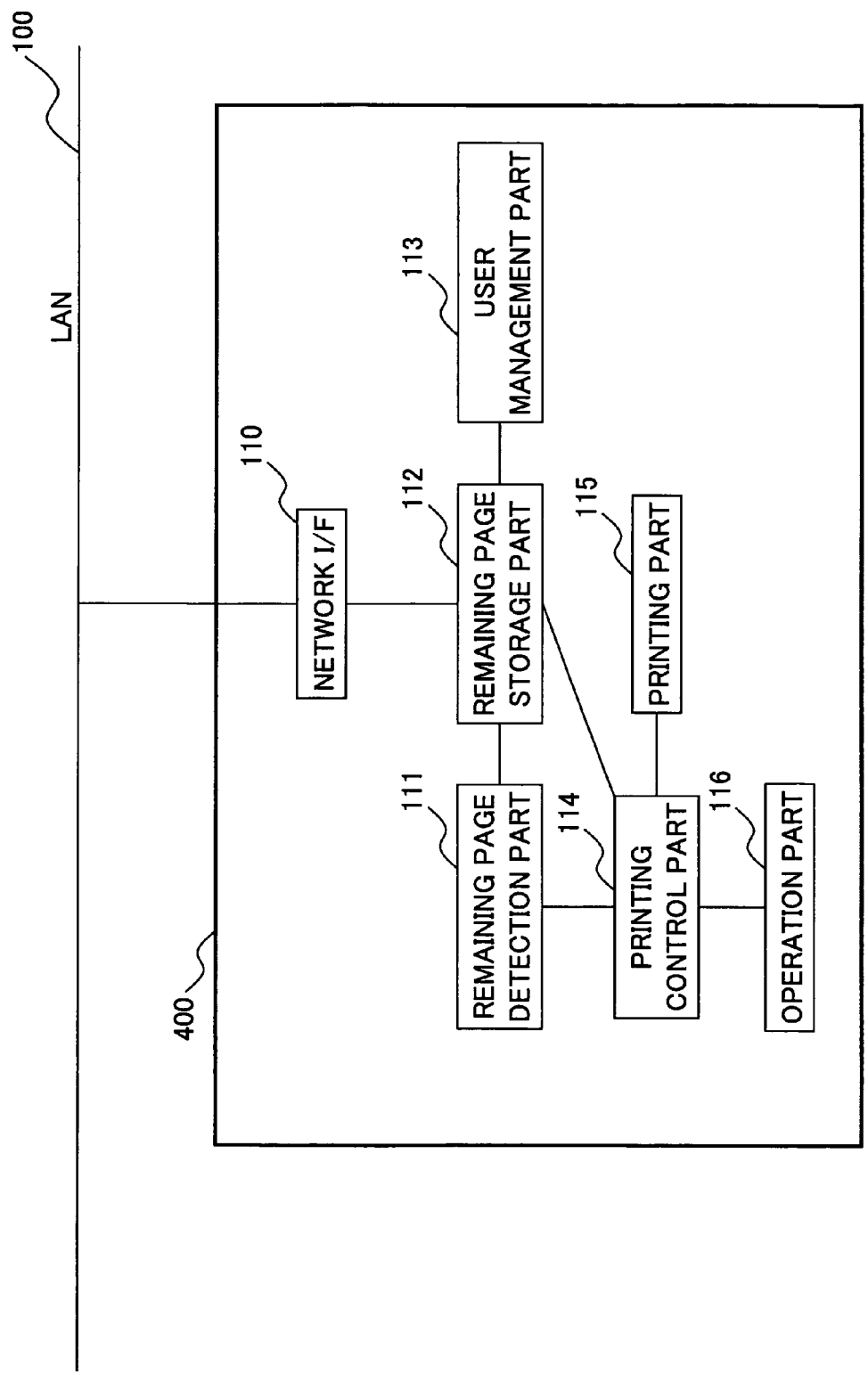
FIG. 4 is a block diagram showing a software configuration of an MFP according to an embodiment of the present invention.

Next, a software configuration of an MFP 400 according to an embodiment of the present invention is described with reference to FIG. 4. The MFP 400 includes a network I/F 110, a remaining page detection part 111, a remaining page storage part (temporary remaining page storage part) 112, a user management part 113, a printing control part 114, a printing part 115, and an operations part 116. The remaining page detection part 111 may include, for example, a page borrowing part, a page returning part, and a supplementary page borrowing part. The user management part 113 or the user data server 105 may, for example, include a verifying part.

The remaining page detection part 111 detects the number of remaining pages (X pages) that can be printed (printable page data). The detection results are sent to the printing control part 114 and the remaining page storing part 112.

The remaining page storage part 112 temporarily stores the printable page data. The remaining page storage part 112 may also serve as a printable page data supplying part for supplying the printable page data to the printout control server 101.

The printing control part 114 controls the printing operations of the MFP 400 based on data such as the printable page data. The printing control part 114 may also serve as a printable page determining part for determining whether a supplementary number of pages to be printed should be lent (authorized to be printed) from the printout control server 101. Furthermore, the printing control part 114 may also serve as a borrowing part or a supplementary page borrowing part for requesting the printout control server 101 to lend a desired number of pages (X, S pages, wherein "X" and "S" may be given integers). Furthermore, the printing control part 114 also serves as a page returning part for returning the remaining number of lent pages obtained by subtracting the number of printed pages (P pages, wherein "P" may be a given integer) from the lent number of pages (X pages, wherein "X" may be a given integer). The printing control part 114 returns a part of or all the number of lent pages to the printout control server 101.

The printing part 115 is for printing a predetermined number of pages (P pages) in accordance with the instructions from the printing control part 114. The user management part 113 manages, for example, names of the user and user IDs registered in the MFP. However, in this example, a large part of managing user data (e.g. names of the user, user IDs) is executed by the user data server 105. The operations part 116 controls the operations panel 53 shown in FIG. 2.

Figure 5:
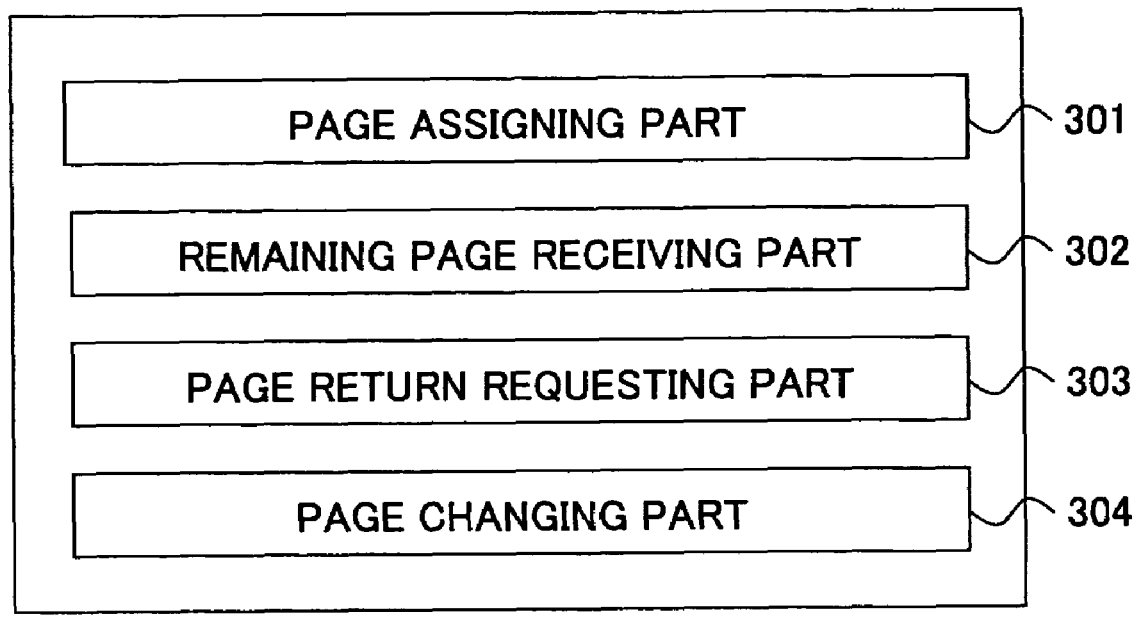
FIG. 5 is a schematic diagram showing a software configuration of a printout control server according to an embodiment of the present invention.

Next, a software configuration of the printout control server 101 according to an embodiment of the present invention is described with reference to FIG. 5. The software configuration of the printout control server 101 shown in FIG. 5 includes a page assigning part 301, a remaining page receiving part 302, a page return requesting part 303, and a page changing part 304.

The page assigning part 301 is for assigning the number of printable pages (X pages) for each image forming apparatus. The remaining page receiving part 302 is for obtaining the remaining number of printable pages (X-P pages) of each image forming apparatus.

The page return requesting part 303 is for requesting a part of or all of the number of assigned printable pages to be returned from the MFP 400. The page changing part 304 is for changing the number of pages that can be printed by the MFP 400 depending on the user operating the MFP 400.

Figure 6:
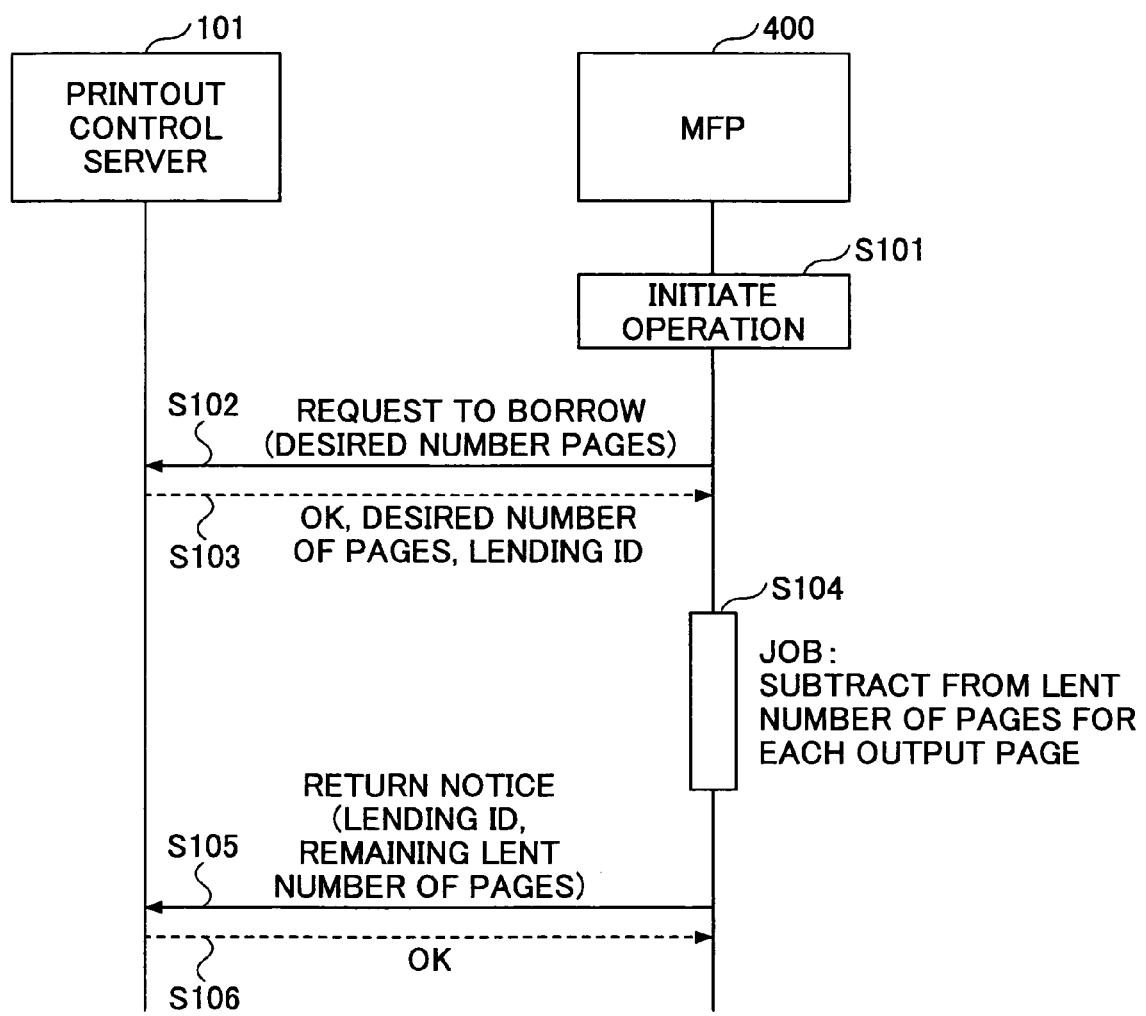
FIG. 6 is a sequence diagram showing a basic case (basic lending and borrowing case) where a printout control server lends a desired number of pages to an MFP according to an embodiment of the present invention.

FIG. 6 is a sequence diagram showing a basic case where the printout control server 101 lends the desired number of pages to an MFP 400. The MFP 400 is one of MFP-A 102, MFP-B 103, or MFP-C 104 shown in FIG. 1.

In Step S101, the user initiates operations. The initiation of operations is, for example, when the MFP 400 detects pressing of a button for starting a copying operation. Then, in Step S102, the MFP 400 sends a request to the printout control server 101 requesting the printout control server 101 to lend the MFP 400 a predetermined number of pages. Since the number of pages desired by the MFP 400 is reported along with this request, the printout control server 101 can detect the desired number of pages. Next, in Step S103, the printout control server 101 sends an acceptance notice (OK), the desired number of pages, and a lending ID to the MFP 400 in a case where the desired number of pages can be lent to the MFP 400. In a case where the desired number of pages cannot be lent to the MFP 400, a denial notice is sent to the MFP 400. The lending ID is assigned in correspondence with each lending transaction. Accordingly, a corresponding relationship of lending and returning can be established.

In Step S104, the MFP 400 starts a job. In this example, a job refers to a copying process. Each time a single page is copied by the MFP 400, one or a predetermined number of pages are subtracted from the number of pages lent from the printout control server 101. After the job is completed, the MFP 400 returns the lending ID and sends a notice reporting the remaining lent number of pages to the printout control server 101 (Step S105). In Step S106, the printout control server 101 sends a notice indicating, for example, safe receipt of the lending ID and the number notice from the MFP 400.

Figure 7:
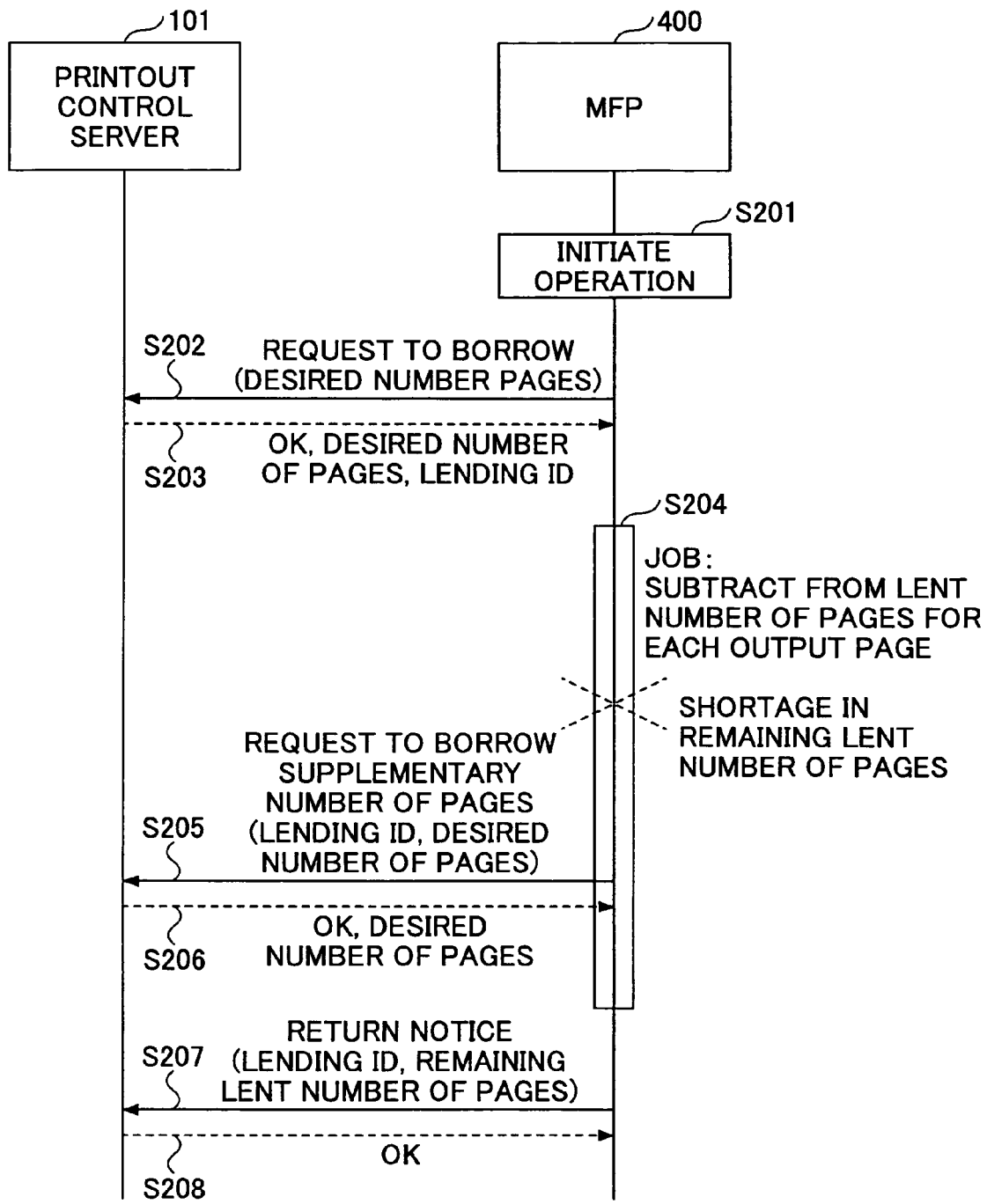
FIG. 7 is a sequence diagram showing a case (supplementary borrowing process) where the number of pages lent to an MFP is not enough according to an embodiment of the present invention.

FIG. 7 is a sequence diagram showing a case where the number of pages lent to the MFP 400 is not enough. Since the steps of S201 to S204 are basically the same as Steps S101 to S104, explanation thereof is omitted. While conducting the job in Step S204, the MFP 400 determines that the remaining number of pages lent from the printout control server 101 is insufficient. In Step S205, the MFP 400 sends a request to the printout control server 101 requesting the printout control server 101 to lend a supplementary number of pages to the MFP 400. Along with this request, the MFP 400 reports the lending ID and the desired number of supplementary pages to the printout control server 101. Then, in Step S206, the printout control server 101 sends an acceptance notice and the desired supplementary number of pages to the MFP 400 in a case where the desired supplementary number of pages can be lent to the MFP 400. After the job is completed, the MFP 400 returns the lending ID and sends a notice reporting the remaining lent number of pages to the printout control server 101 (Step S207). In Step S208, the printout control server 101 sends a notice indicating, for example, safe receipt of the lending ID and the notice from the MFP 400.

Figure 8:
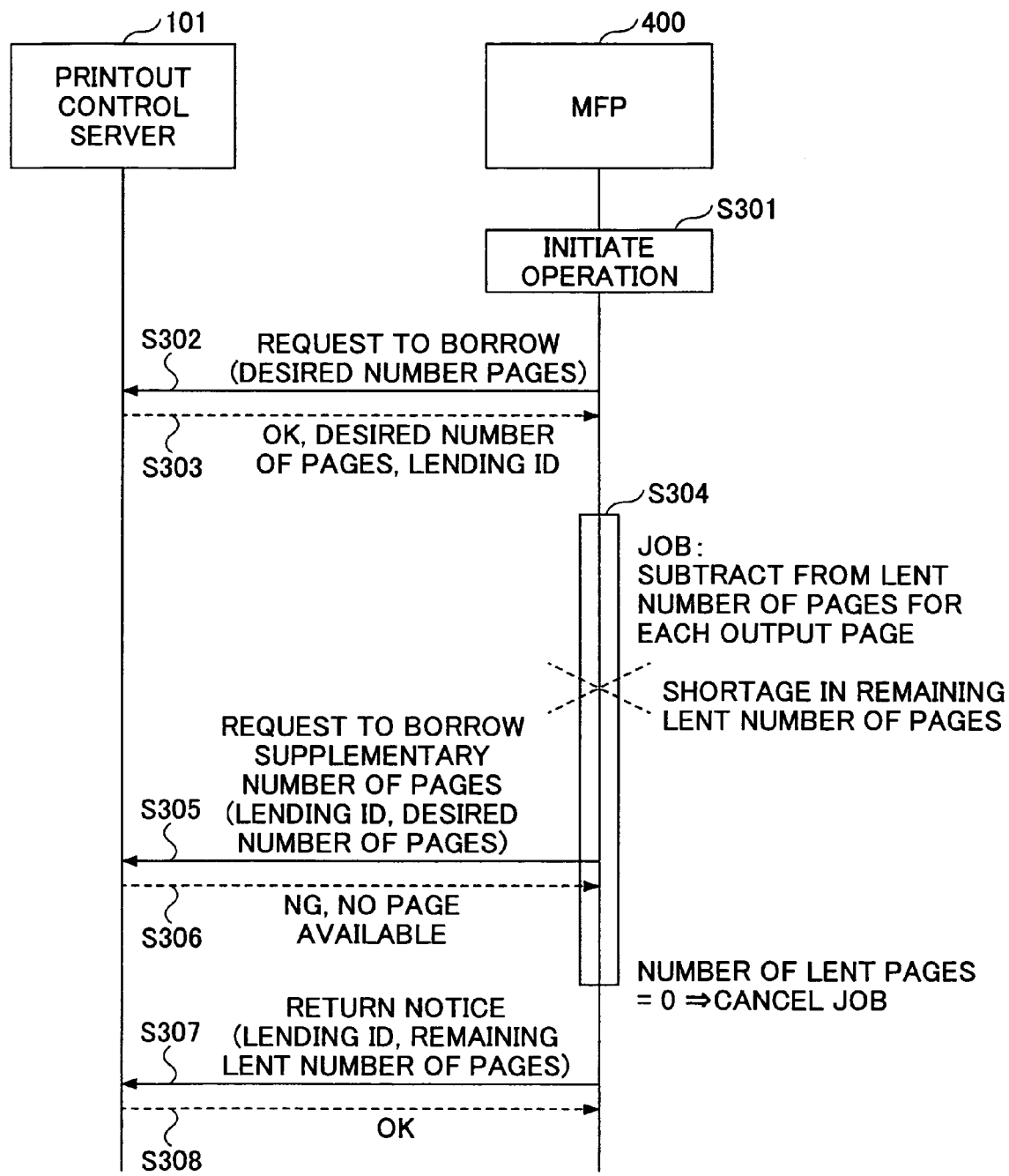
FIG. 8 is a sequence diagram showing a case (stopping a job) where the number of supplementary pages for lending to an MFP is not enough according to an embodiment of the present invention.

FIG. 8 is a sequence diagram showing a case where the number of supplementary pages for lending to the MFP 400 is not enough. Since the steps of S301 to S305 are basically the same as Steps S201 to S205 of FIG. 7, explanation thereof is omitted.

In Step S306, when there are no or an insufficient number of pages to lend to the MFP 400, the printout control apparatus 101 sends a denial notice (NG) to the MFP 400 reporting that the requested supplementary number of pages cannot be lent. Upon receiving the denial notice, the MFP 400 cancels (stops) execution of the job since the MFP 400 is no longer able to complete the job. After the job is cancelled, the MFP 400 returns the lending ID and sends a notice reporting the remaining lent number of pages to the printout control server 101 (Step S307). In Step S308, the printout control server 101 sends a notice indicating, for example, safe receipt of the lending ID and the number notice from the MFP 400.

Although the remaining lent number of pages reported by the MFP 400 in Step S307 is usually 0 pages, the MFP 400 may cancel the job at a desired timing such that there may be some number of pages remaining after the job is cancelled. For example, in a case of making five copies of a twenty page document, since the MFP 400 can detect the number of pages of the target document beforehand, the MFP 400 may cancel the job at a desired timing (e.g. when the number of remaining lent pages is less than twenty pages after making two copies of the document).

Figure 9:
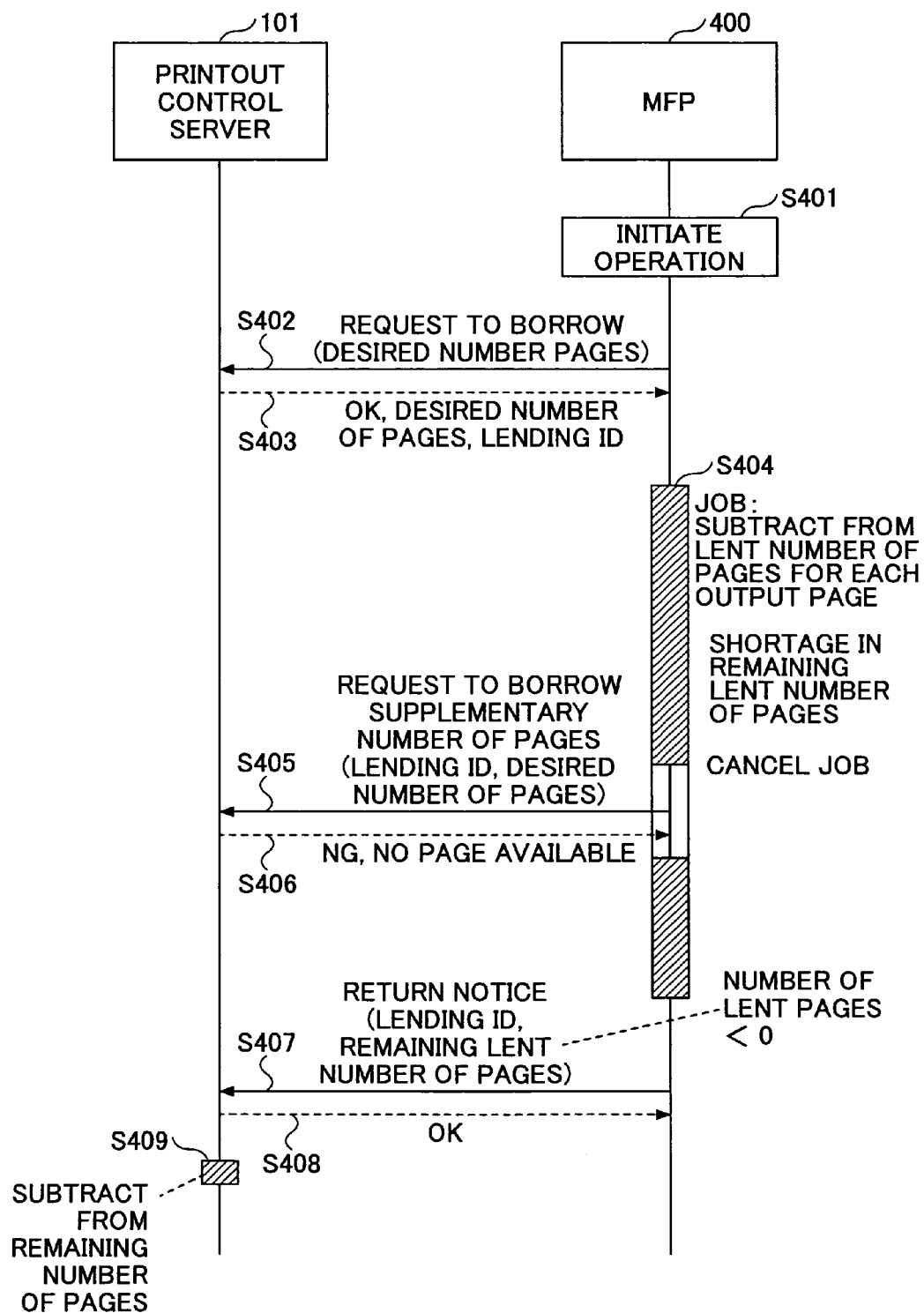
FIG. 9 is a sequence diagram showing a case where an MFP continues to execute a job even when a printout control server has no supplementary pages to lend to the MFP according to an embodiment of the present invention.

FIG. 9 is a sequence diagram showing a case where the MFP 400 continues to execute the job even when the printout control server 101 has no supplementary pages to lend to the MFP 400. Since the steps of S401 to S406 are basically the same as Steps S301 to S306 of FIG. 8, explanation thereof is omitted.

Even after receiving the denial notice in Step S406, the MFP 400 continues to execute the job. After the job is completed, the MFP 400 returns the lending ID and sends a notice reporting the remaining lent number of pages to the printout control server 101 (Step S407). In Step S408, the printout control server 101 sends a notice indicating, for example, safe receipt of the lending ID and the number notice from the MFP 400. Then, in Step S409, the printout control server 101 performs subtraction on the remaining lending number of pages in accordance with the lent number of pages reported from the MFP 400.

Since the job is continued (i.e. not cancelled) by the MFP 400 regardless of the shortage of lent number of pages, the remaining number of lent pages of the MFP 400 is negative (minus). Therefore, the number of pages is subtracted from the remaining lending number of pages of the printout control server 101.

Next, a process of the MFP in a case where the user logs onto the network (e.g. LAN 100) is described.

Figure 10:
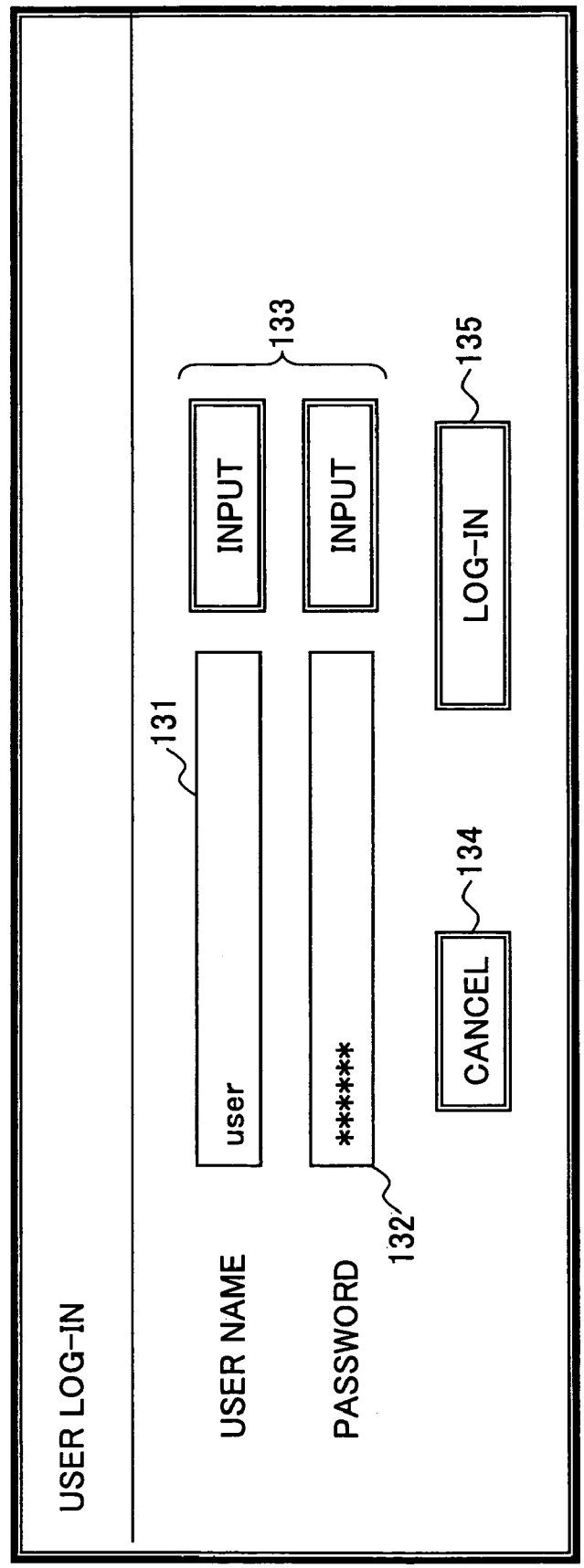
FIG. 10 depicts a user log-in screen according to an embodiment of the present invention.

First, a user log-in screen 130 according to an embodiment of the present invention is described with reference to FIG. 10. The user log-in screen 130 shown in FIG. 10 is displayed on an MFP (102, 103, 104). The user log-in screen 130 includes, for example, a user name entry space 131, a password entry space 132, a pair of input buttons 133, a cancel button 134, and a log-in button 135.

The user name entry space 131 is for entering the name of the user. The password entry space 132 is for entering a password. The corresponding input buttons 133 are to be depressed when the user name and the password are entered in the user name entry space 131 and the password entry space 132. The cancel button 134 is depressed when the user wishes to cancel this log-in screen 130. The log-in button 135 is depressed when logging onto the network after entering the user name and password.

Figure 11:
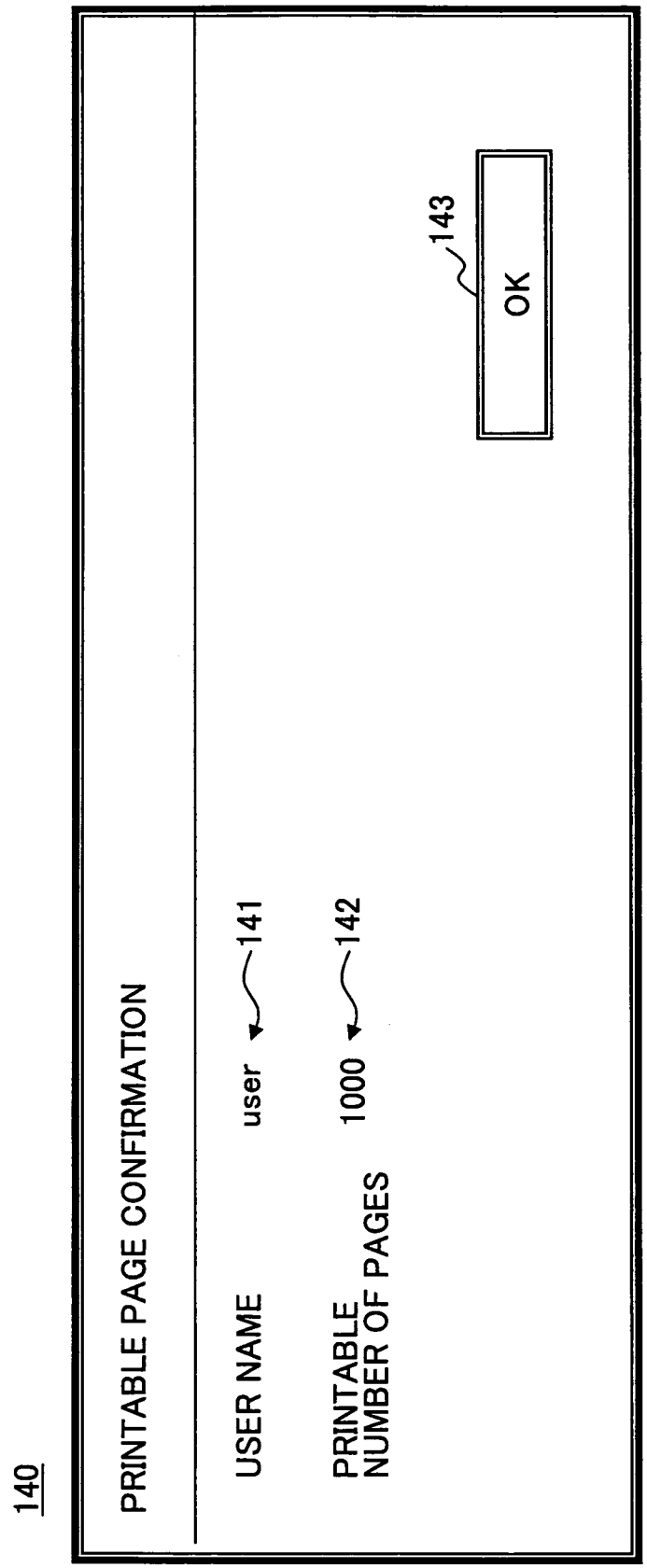
FIG. 11 depicts a printable page confirmation screen according to an embodiment of the present invention.

When the user succeeds in logging onto the network 100, a printable page confirmation screen 140 shown in FIG. 11 is displayed on the MFP. The printable page confirmation screen 140 shows the name of the user that is currently logged on to the network (logged on user name 141) and the number of pages that can be printed (printable page count 142). In FIG. 11, "user" is displayed as the logged on user name 141 and "1000" pages is displayed as the printable page count 142. The MFP can be used once the OK button 143 of the printable page confirmation screen 140 is depressed.

Figure 12:
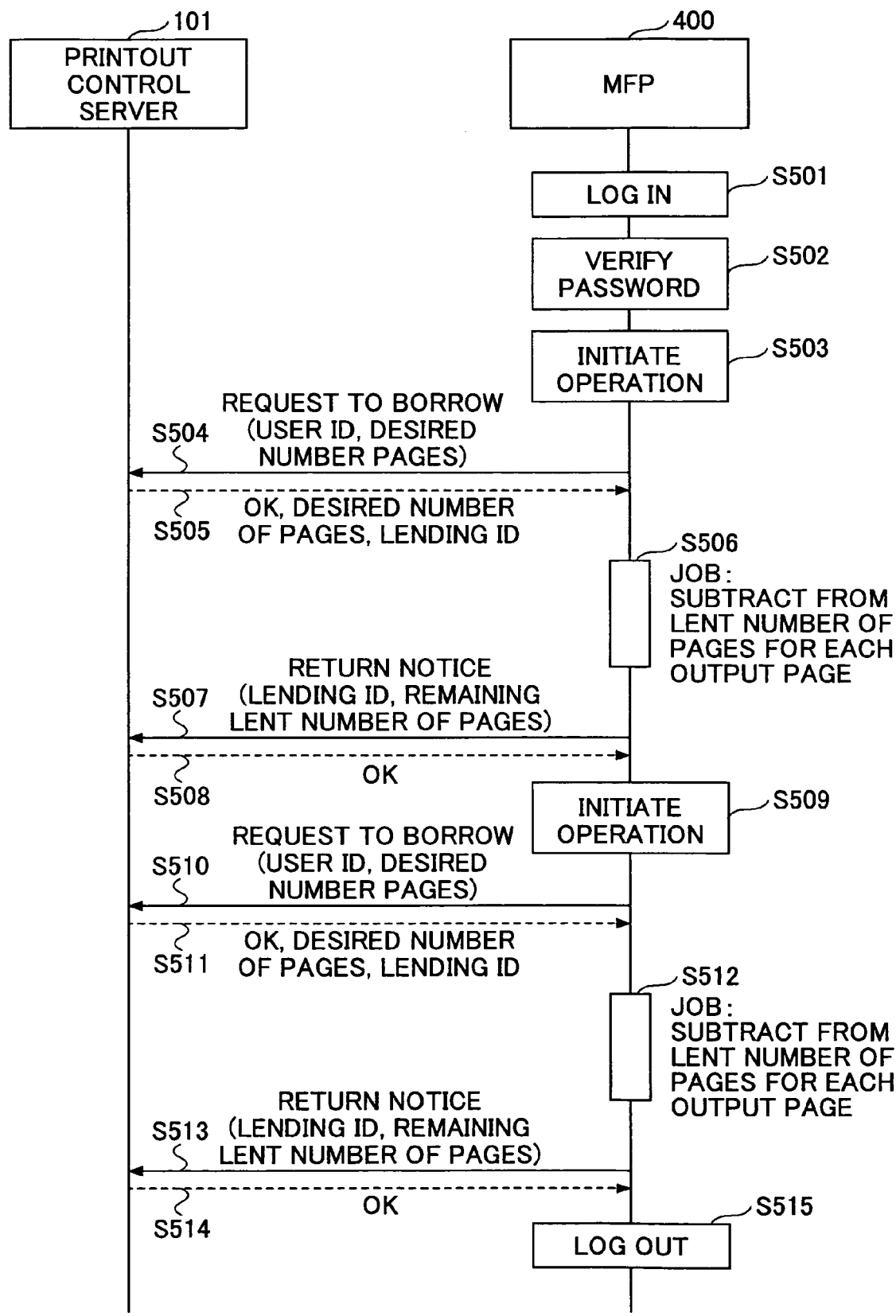
FIG. 12 is a sequence diagram in a regular case where a printout control server executes a process of lending a desired number of pages requested by an MFP according to an embodiment of the present invention.

FIG. 12 shows a sequence diagram in a regular case where the printout control server 101 executes a process of lending a desired number of pages requested by the MFP 400.

In Step S501, the user logs onto the network 100 through the above-described log-in screen 130. In Step S502, the user data server 105 verifies the password entered by the user. In this example, the current user is an authorized user.

In Step S503, the user initiates operations (e.g. a copying operation) of the MFP 400. In Step S504, the MFP 400 sends a request to the printout control server 101 requesting the printout control server 101 to lend the MFP 400 a predetermined number of pages. Since the user ID and the number of pages desired by the MFP 400 are reported along with this request, the printout control server 101 can detect the user ID and the desired number of pages. Next, in Step S505, the printout control server 101 sends an acceptance notice, the desired number of pages, and a lending ID to the MFP 400 in a case where the desired number of pages can be lent to the MFP 400. In Step S505, since the printout control server 101 can detect the user ID, the printout control server 101 may limit the number of pages to be lent to the MFP 400 depending on each user.

In Step S506, the MFP 400 starts a job (e.g. copying process). After the job is completed, the MFP 400 returns the lending ID and sends a number notice reporting the remaining lent number of pages to the printout control server 101 (Step S507). In Step S508, the printout control server 101 sends a notice indicating, for example, safe receipt of the lending ID and the notice from the MFP 400.

Then, in executing a further operation, the logged-on user initiates operations (e.g. a copying operation) of the MFP 400 again (Step S509). Since the user is already logged onto the network, the user does not need to perform the log-in process. In Step S510, the same as Step S504, the MFP 400 sends a request to the printout control server 101 requesting the printout control server 101 to lend the MFP 400 a predetermined number of pages. Next, in Step S511, the printout control server 101 sends an acceptance notice, the desired number of pages, and a lending ID to the MFP 400 in a case where the desired number of pages can be lent to the MFP 400.

In Step S512, the MFP 400 starts a job (e.g. a copying process). After the job is completed, the MFP 400 returns the lending ID and sends a notice reporting the remaining lent number of pages to the printout control server 101 (Step S513). In Step S514, the printout control server 101 sends a notice indicating, for example, safe receipt of the lending ID and the notice from the MFP 400. Then, in Step S515, the user logs out from the network 100.

Figure 13:
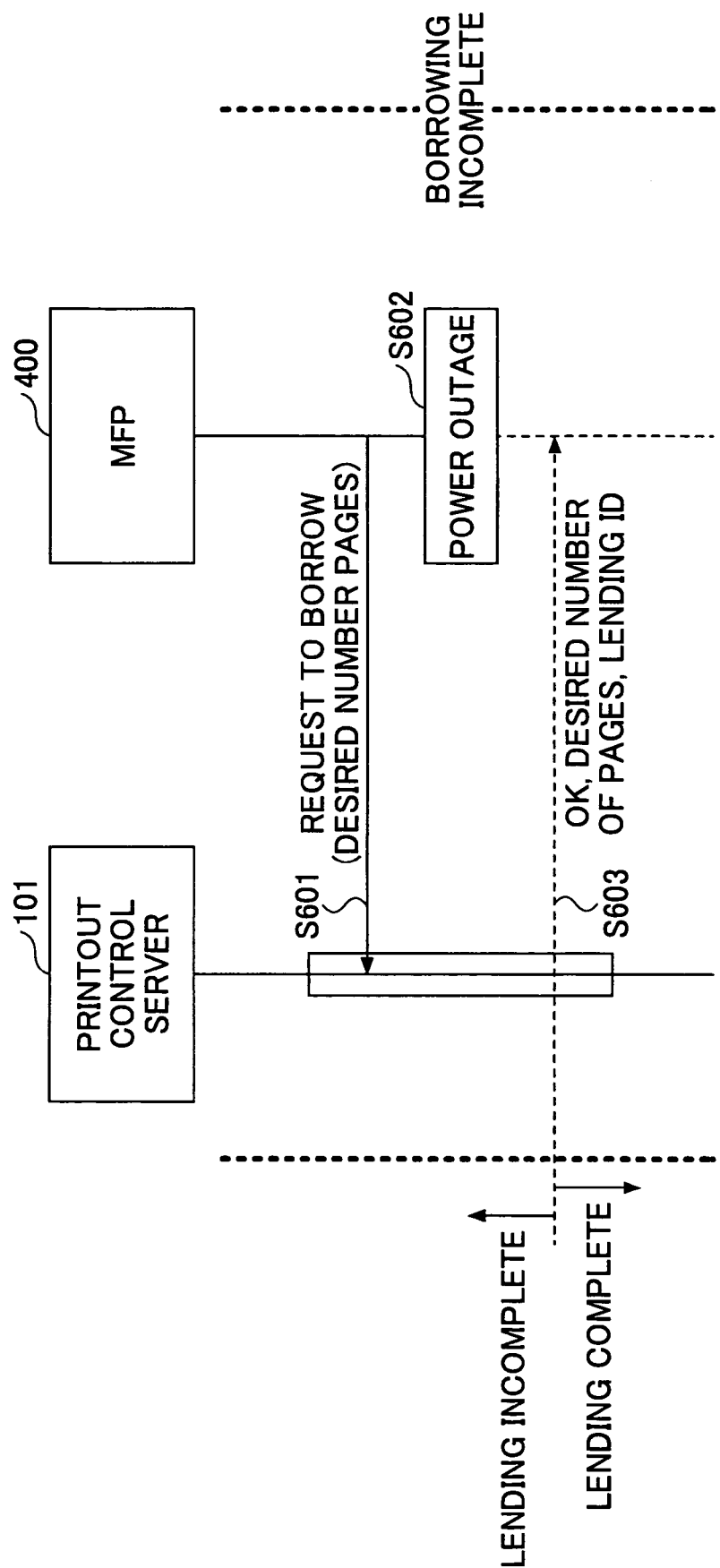
FIG. 13 is a sequence diagram in an irregular case where an inconsistency in a lending transaction between a printout control server and an MFP is caused by a power outage according to an embodiment of the present invention.

FIG. 13 is a sequence diagram in an irregular case where an inconsistency in the lending transaction between the printout control server 101 and the MFP 400 is caused by, for example, power outage.

In Step S601 shown in FIG. 13, the MFP 400 sends a request to the printout control server 101 requesting the printout control server 101 to lend the MFP 400 a predetermined number of pages. In this example, it is supposed that a power outage occurs in the MFP 400 during Step S602. In Step S603, the printout control server 101, being unaware of the power outage, sends an acceptance notice, the desired number of pages, and a lending ID to the MFP 400.

Figure 14:
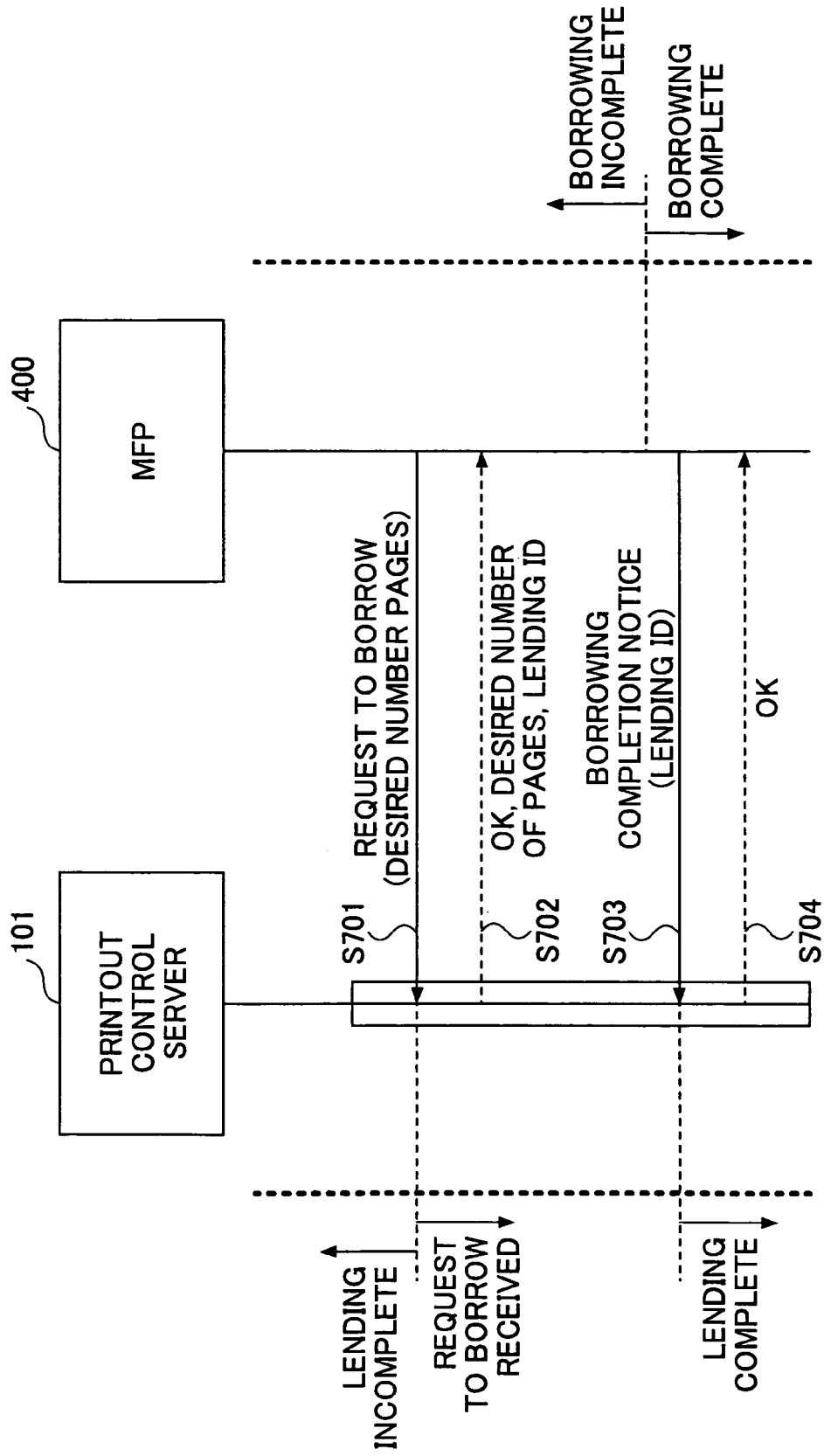
FIG. 14 is a sequence diagram of a sequence for preventing inconsistency in a lending transaction according to an embodiment of the present invention.

In Step S603, the printout control server 101 is in the process of completing the lending in response to the request from the MFP 400 even though the MFP 400 has not yet borrowed (received permission to print) the requested number of pages. As a result, an inconsistency occurs in the lending transaction between the printout control server 101 and the MFP 400. FIG. 14 is a sequence diagram of a sequence for preventing the inconsistency. In Step S701, the MFP 400 sends a request to the printout control server 101 requesting the printout control server 101 to lend the MFP 400 a predetermined number of pages. Then, in Step S702, the printout control server 101 sends an acceptance notice, the desired number of pages, and a lending ID to the MFP 400. Then, in Step S703, the MFP 400 sends a borrowing completion notice and the lending ID to the printout control server 101. In Step S704, the printout control server 101, in response to the report of Step S703, sends a notice indicating, for example, safe receipt of the lending ID and the borrowing completion report from the MFP 400.

In the above-described sequence, the MFP 400, prior to Step S701, has not yet borrowed a desired number of pages from the printout control server 101 (request for a desired number of pages is not yet sent to the printout control server 101). In Steps S701-703, the MFP 400 has sent the request for a desired number of pages to the printout control server 101. That is, until Step S703, the MFP 400 has not yet completed borrowing the desired number of pages from the printout control server 101. After Step S703, the MFP 400 has completed borrowing the desired number of pages from the printout control server 101.

Therefore, even in a case where there is a power outage as shown in FIG. 13 occurs, inconsistency of the lending transaction between the printout control server 101 and the MFP 400 can be prevented.

Figure 15:
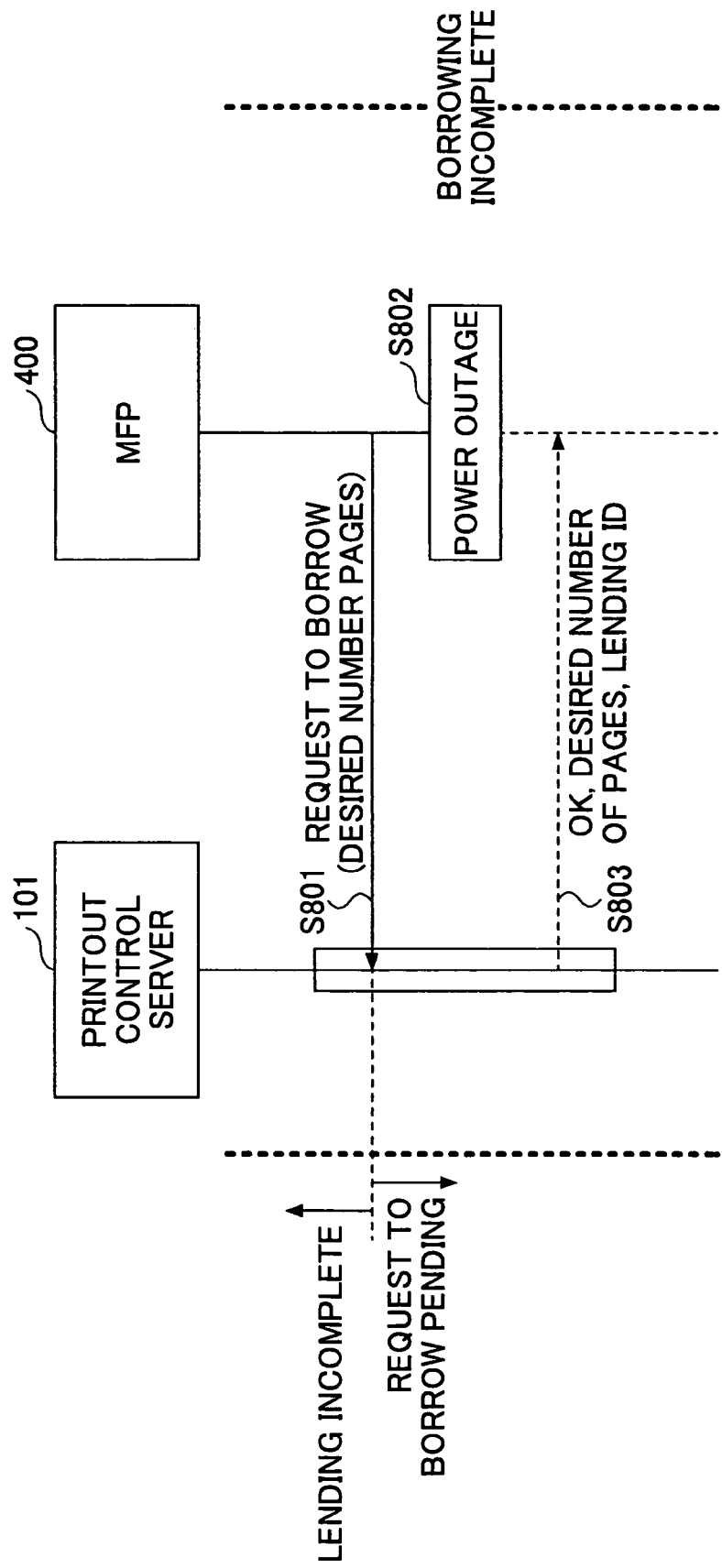
FIG. 15 depicts a case of applying the sequence for preventing inconsistency in a lending transaction according to an embodiment of the present invention.

FIG. 15 shows a case of actually applying the above-described sequence. In Step S801, the MFP 400 sends a request to the printout control server 101 requesting the printout control server 101 to lend the MFP 400 a predetermined number of pages. Then, a power outage occurs in the MFP 400 during Step S802. In Step S803, the printout control server 101, being unaware of the power outage, sends an acceptance notice, the desired number of pages, and a lending ID to the MFP 400. However, at this step, the printout control server 101 has merely received the request from the MFP 400, and has not completed the lending to the MFP 400. Therefore, inconsistency of the lending transaction between the printout control server 101 and the MFP 400 can be prevented.

Figure 16:
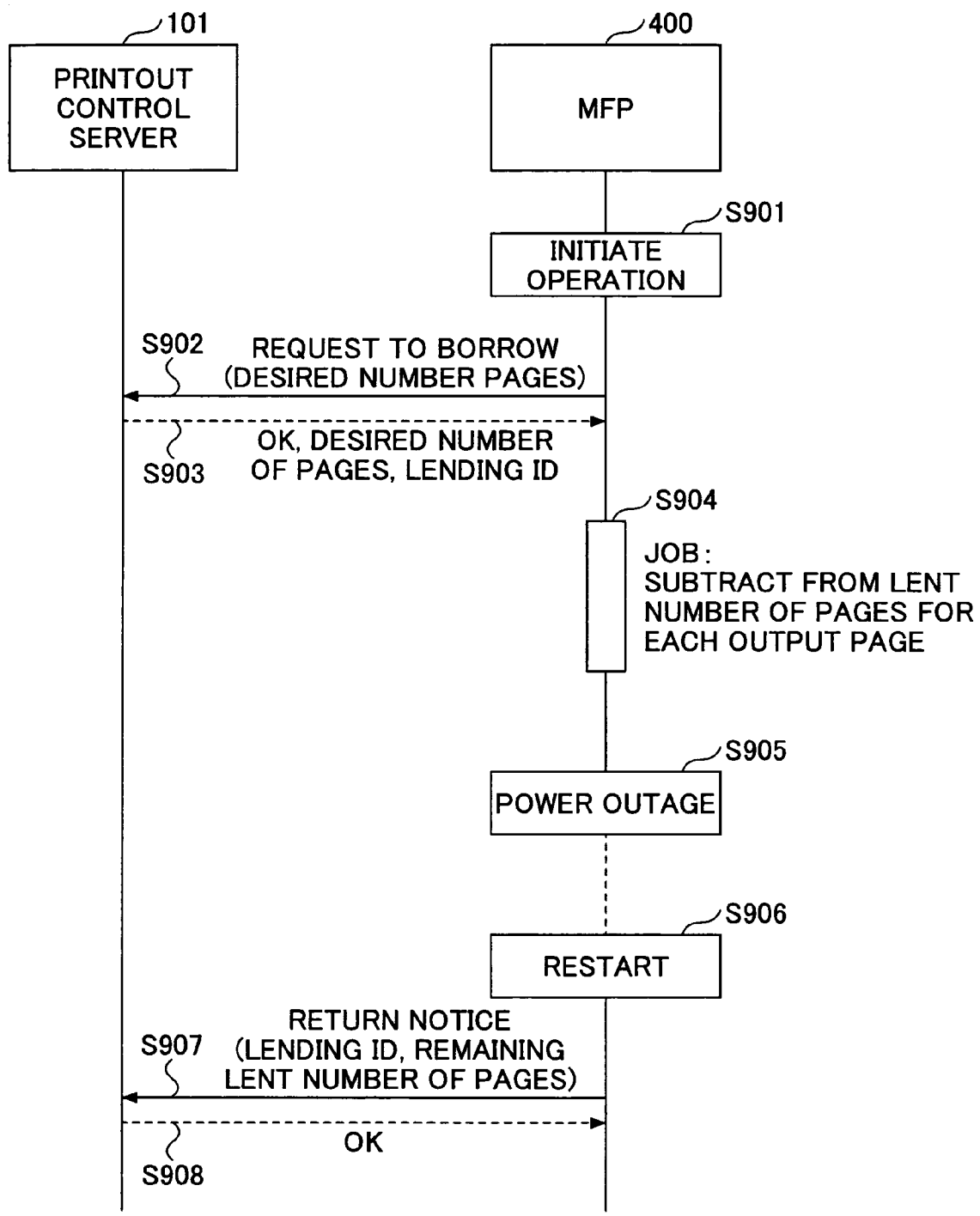
FIG. 16 is a sequence diagram showing a case where a power outage occurs after a job is completed according to an embodiment of the present invention.

Next, FIG. 16 is another sequence diagram showing a case where power outage occurs after a job is completed. Since Steps S901-S904 in FIG. 16 are substantially the same as the above-described Steps S101-S104, explanation thereof is omitted.

After a job is completed in Step S904, a power outage occurs in the MFP 400 during Step S905. Then, in Step S906, the MFP 400 is restarted (rebooted). Then, in Step S907, the MFP 400 returns the lending ID and sends a notice reporting the remaining lent number of pages to the printout control server 101. In Step S908, the printout control server 101 sends a notice indicating, for example, safe receipt of the lending ID and the number notice from the MFP 400.

In the case of sending the lending ID and the number notice to the printout control server 101 after restarting the MFP 400, it is preferable to store the lending ID and the remaining lent number of pages in a non-volatile memory apparatus (e.g. flash memory, backup RAM).

Figure 17:
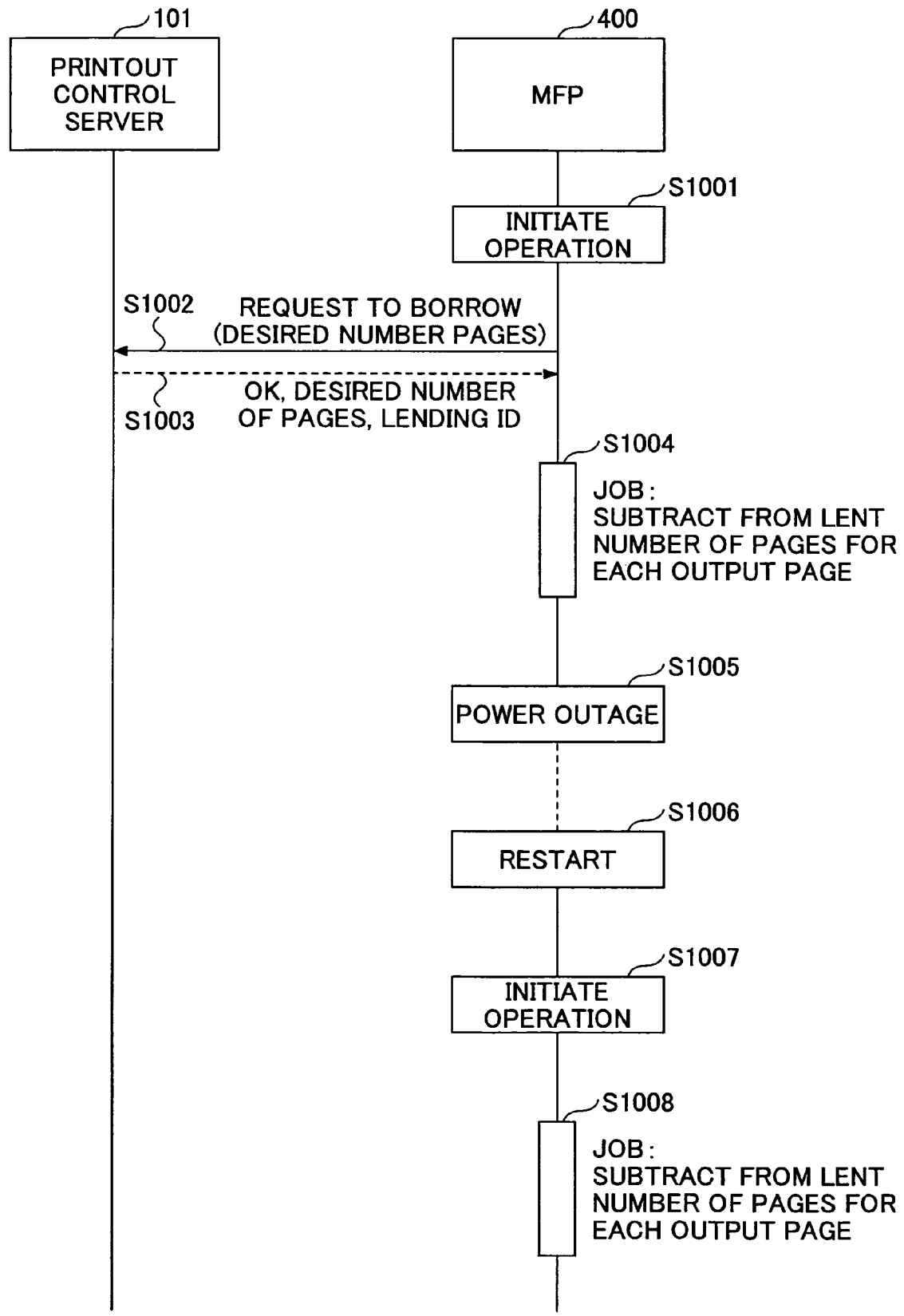
FIG. 17 is a sequence diagram showing a case where a subsequent job is executed without having an MFP return a remaining lent number of pages to a printout control server according to an embodiment of the present invention.

FIG. 17 is another sequence diagram showing a case where a subsequent job is executed without having the MFP 400 return the remaining lent number of pages to the printout control server 101. Since Steps S1001-S1006 in FIG. 17 are substantially the same as the above-described Steps S901-S906, explanation thereof is omitted.

After the MFP 400 is restarted, the user initiates operations (e.g. a copying operation) of the MFP 400 again. Once it is confirmed that the remaining pages are not 0 pages, the MFP 400 starts a job (e.g. a copying process) in Step S1008.

In a case of using an MFP that requires a log-in process by the user, the verification step (as shown in Step S501 in FIG. 12) is performed prior to Step S1007.

Figure 18:
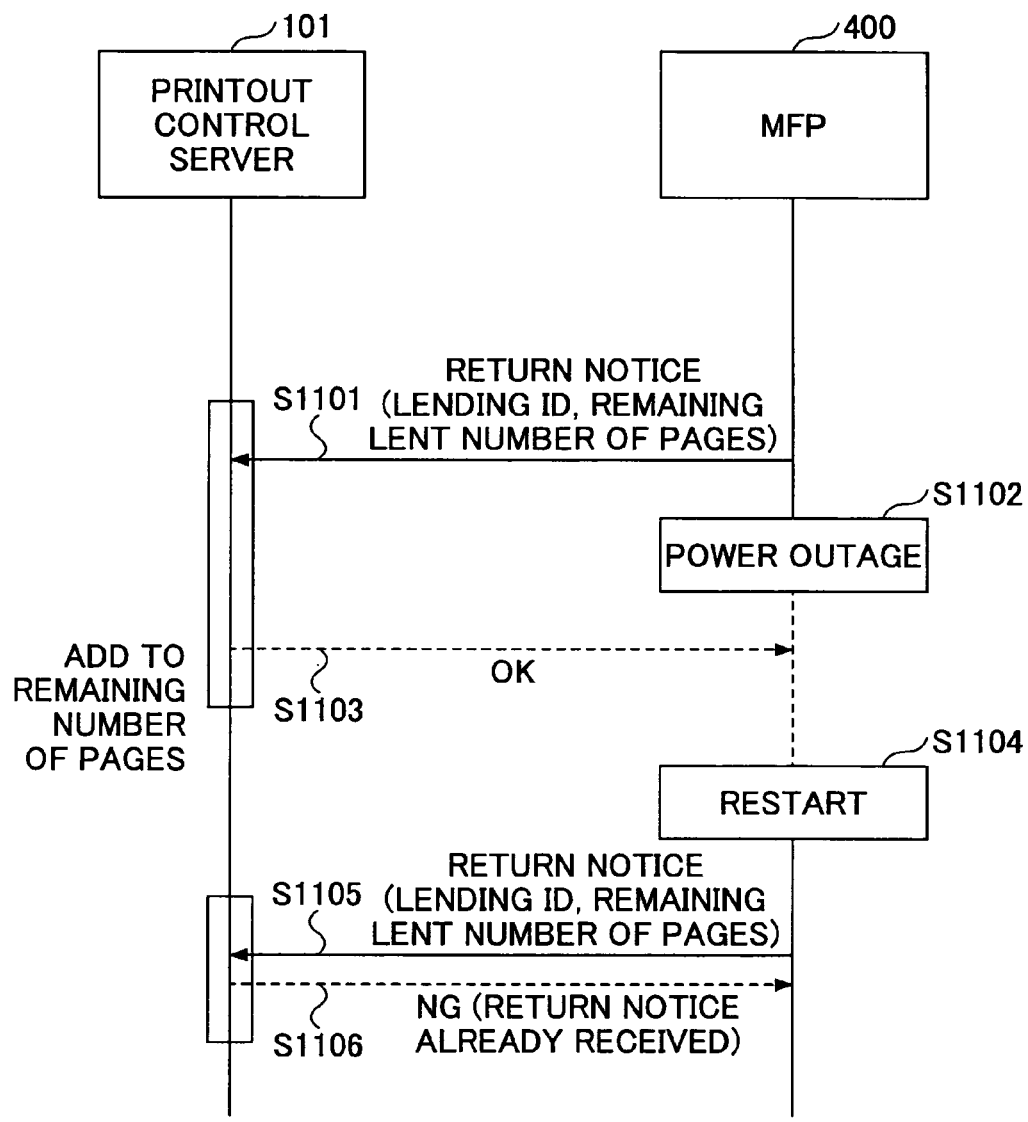
FIG. 18 is a sequence diagram showing a sequence for preventing doubly returning of lent remaining number of pages according to an embodiment of the present invention.

Next, FIG. 18 is another sequence diagram showing a sequence for preventing doubly returning lent remaining number of pages. This double returning of lent remaining number of pages is a case where a power outage occurs after the MFP 400 performs a process of returning the lent remaining number of copies such that the MFP 400 performs the process of returning the lent remaining number of copies for the second time.

In Step S1101 of FIG. 18, the MFP 400 returns the lending ID and sends a notice reporting the remaining lent number of pages to the printout control server 101. Then, a power outage occurs in the MFP 400 during Step S1102. As a result, the MFP 400 is unable to receive the return notice from the printout control server 101 indicating, for example, safe receipt of the lending ID and the number notice from the MFP 400. Therefore, the MFP 400 is in an unconfirmed state as though the MFP 400 has not returned the lending ID and not sent the notice reporting the remaining lent number of pages to the printout control server 101.

After the MFP 400 is restarted in Step S1104, the MFP 400 again returns the lending ID and sends a notice reporting the remaining lent number of pages to the printout control server 101 (S1105). Since the printout control server 101 has already sent the notice indicating safe receipt of the lending ID to the MFP 400, the printout control server 101 sends an error notice (NG) to the MFP 400 (S1106).

Figure 19:
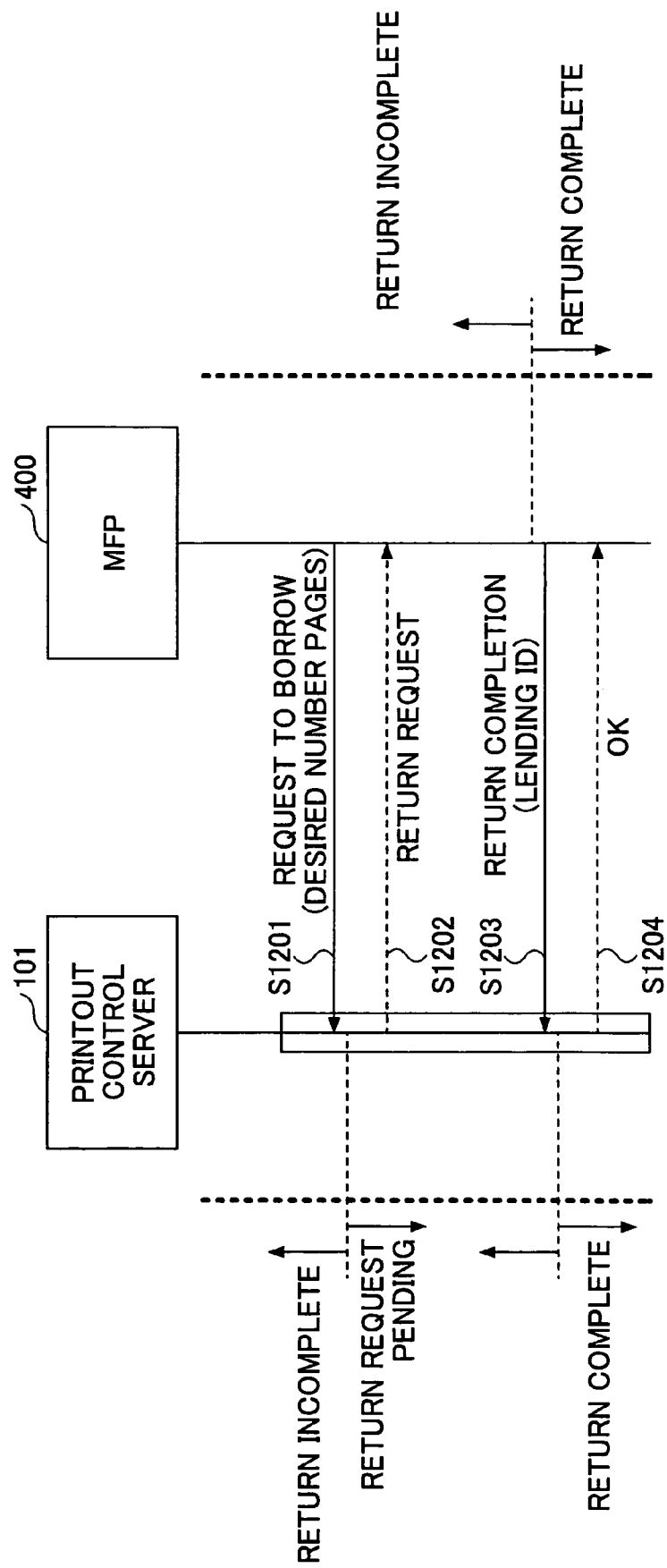
FIG. 19 is a sequence diagram of a sequence for preventing doubly returning the lent remaining number of pages according to an embodiment of the present invention.

FIG. 19 is a sequence diagram of a sequence for preventing doubly returning the remaining lent number of pages. In Step S1201, the MFP 400 returns the lending ID and sends a notice reporting the remaining lent number of pages to the printout control server 101. Then, in Step S1202, the printout control server 101 sends a notice indicating a request for returning the lent lending ID and number of pages in response to the request from the MFP 400. Then, in response to the return request notice from the printout control server 101, the MFP 400 sends a notice indicating completion of the returning of the lent number of pages (return completion notice). The lending ID is also sent with the return completion notice. Then, in Step S1204, the printout control server 101 sends a notice indicating safe receipt of the return completion notice.

In the above-described sequence shown in FIG. 19, the MFP 400 has not returned the lent remaining pages to the printout control server 101 before Step S1201. In Steps S1201-S1203, the MFP 400 has merely received the return request notice from the printout control server 101. That is, the MFP 400 has not completed the returning of the lending ID and the remaining lent number of pages.

After Step S1203, the MFP 400 has sent the return completion notice to the printout control server 101. Thereby, the double returning problem can be prevented even in a case where a power outage occurs after Step S1201 (i.e. after requesting a desired number of pages).

Further, the present invention is not limited to these embodiments, but variations and modifications may be made without departing from the scope of the present invention.

The present application is based on Japanese Priority Application No. 2005-212485 filed on Jul. 22, 2005, with the Japanese Patent Office, the entire contents of which are hereby incorporated by reference.

What is claimed is:

1. An image forming apparatus connected to a printout control server that manages the number of pages printed by the image forming apparatus, the image forming apparatus comprising:
   a page borrowing part for requesting the printout control server to lend X number of pages;
   a printing part for printing P pages after the page borrowing part borrows X number of pages from the printout control server; and
   a page returning part for returning X-P number of pages to the printout control server.

2. The image forming apparatus as claimed in claim 1, further comprising:
   a printable page determining part for determining whether X number of pages is enough for printing P number of pages during the printing operation;
   a supplementary page borrowing part for requesting the printout control server to lend S number of pages when the printable page determining part determines that X number of pages is not enough for printing P number of pages.

3. The image forming apparatus as claimed in claim 2, wherein the printing part continues printing even when S number of pages cannot be borrowed from the printout control server.

4. The image forming apparatus as claimed in claim 1, wherein the printing part stops printing after printing X number of pages.

5. The image forming apparatus of claim 4, wherein the printing part is configured to stop printing when the number of pages to be printed is greater than the borrowed number of pages.

6. The image forming apparatus as claimed in claim 1, further comprising:
   a verifying part for verifying the user operating the image forming apparatus.

7. The image forming apparatus of claim 6, wherein the page borrowing part is configured to send an identifier identifying a verified user along with the lend request to the printout control server.

8. The image forming apparatus as claimed in claim 1, wherein the page borrowing part determines that the X number of pages is borrowed after receiving a borrowing completion notice from the printout control server.

9. The image forming apparatus as claimed in claim 1, wherein when a power outage occurs in the image forming apparatus during the printing operation, the page borrowing part returns X number of pages to the printout control server when the image forming apparatus is restarted.

10. The image forming apparatus as claimed in claim 1, wherein when a power outage occurs in the image forming apparatus during the printing operation, the printing part resumes printing when the image forming apparatus is restarted in a case where the printing of P number of pages is not completed.

11. The image forming apparatus as claimed in claim 1, wherein the page returning part sends a return completion notice when receiving a notice from the printout control server indicating the receipt of X-P number of pages.

12. A printout control server that manages the number of pages that are printed by an image forming apparatus, the printout control server comprising:
   a page assigning part for assigning X number of pages to the image forming apparatus, wherein
      the page assigning part assigns X number of pages based on a lend request received from the image forming apparatus and X is the number of pages printable by the image forming apparatus.

13. The printout control server as claimed in claim 12, further comprising:
   a remaining page receiving part for receiving X-P number of pages from the image forming apparatus after the image forming apparatus prints P number of pages.

14. The printout control server as claimed in claim 12, wherein the image forming apparatus is connected to the printout control server and includes,
   a page borrowing part for requesting the printout control server to lend X number of pages;
   a printing part for printing P pages after the page borrowing part borrows X number of pages from the printout control server; and
   a page returning part for returning X-P number of pages to the printout control server.

15. The printout control server of claim 12, wherein the printout control server is configured to manage the number of printable pages with respect to each user.

16. The printout control server of claim 15, wherein the lend request includes an identifier identifying the user.

17. A computer readable recording medium on which a program is recorded for causing a computer to execute a printout control method for managing the number of pages printed by an image forming apparatus connected to a printout control server, the printout control method comprising the steps of:
   a) requesting the printout control server to lend X number of pages;
   b) directing the image forming apparatus to print P number of pages after borrowing X number of pages from the printout control server; and
   c) returning X-P number of pages to the printout control server.

* * * * *